US012734860B2

(12) United States Patent
Kang et al.

(10) Patent No.: US 12,734,860 B2
(45) Date of Patent: Sep. 15, 2026

(54) MANIFOLD FLUID MODULE

(71) Applicant: Hanon Systems, Daejeon (KR)

(72) Inventors: In Keun Kang, Daejeon (KR); Young Man Kim, Daejeon (KR); In Hyeok Kim, Daejeon (KR); Jae Kyun Kim, Daejeon (KR); Kyeong Cheol Lee, Daejeon (KR); Jae Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/840,942

(22) PCT Filed: Jun. 23, 2023

(86) PCT No.: PCT/KR2023/008748
§ 371 (c)(1),
(2) Date: Aug. 23, 2024

(87) PCT Pub. No.: WO2024/014739
PCT Pub. Date: Jan. 18, 2024

(65) Prior Publication Data
US 2026/0027870 A1 Jan. 29, 2026

(30) Foreign Application Priority Data
Jul. 15, 2022 (KR) ........................ 10-2022-0087569

(51) Int. Cl.
*B60H 1/32* (2006.01)
*B60H 1/00* (2006.01)

(52) U.S. Cl.
CPC ....... *B60H 1/3229* (2013.01); *B60H 1/00385* (2013.01)

(58) Field of Classification Search
CPC ................ B60H 1/3229; B60H 1/3227; B60H 1/00571; F28D 1/05391
See application file for complete search history.

(56) References Cited

U.S. PATENT DOCUMENTS

2010/0071639 A1* 3/2010 Wegner ..................... F28F 9/26 60/599
2019/0039440 A1* 2/2019 Calderone ............ B60K 7/0007
(Continued)

FOREIGN PATENT DOCUMENTS

CN 113276630 A 8/2021
CN 114562832 A * 5/2022 ................ F25B 1/00
(Continued)

OTHER PUBLICATIONS

International Search Report issued in PCT/KR2023/008748 on Sep. 20, 2023.

*Primary Examiner* — Lionel Nouketcha
(74) *Attorney, Agent, or Firm* — NORTON ROSE FULBRIGHT US LLP

(57) ABSTRACT

The present invention relates to a manifold fluid module. The manifold fluid module integrating at least one heat exchanger, at least one valve, and at least one expansion valve integrated into a single unit for a thermal management system including a compressor, a plurality of heat exchangers, a plurality of valves, and expansion valves, may include a manifold plate including a plurality of fluid passages formed internally, wherein the fluid passages may include a low-temperature fluid passage through which heat-exchanged low-temperature fluid flows and a plurality of fluid inlets and a fluid outlet are connected, with the fluid inlets including an evaporator inlet port connected to an outlet of the evaporator, the evaporator inlet port being arranged on the low-temperature fluid passage.

19 Claims, 6 Drawing Sheets

(56) References Cited

U.S. PATENT DOCUMENTS

| | | | |
|---|---|---|---|
| 2021/0086587 A1 | 3/2021 | Koberstein et al. | |
| 2023/0339284 A1* | 10/2023 | Ye | B60H 1/00342 |

FOREIGN PATENT DOCUMENTS

| | | |
|---|---|---|
| JP | H10103893 A | 4/1998 |
| JP | 2008111624 A | 5/2008 |

* cited by examiner

MANIFOLD FLUID MODULE

TECHNICAL FIELD

The present invention relates to a manifold fluid module, and more particularly, to a manifold fluid module that modularizes components such as heat exchangers and valves into a single unit.

BACKGROUND ART

Amidst the growing emphasis on environmentally friendly industrial development and the pursuit of energy sources to replace fossil fuels, electric vehicles and hybrid vehicles have emerged as the most prominent areas of interest in the automotive industry. Both electric vehicles and hybrid vehicles are equipped with batteries to provide driving power, and these batteries are also utilized for heating and cooling purposes in addition to driving operations.

In vehicles that rely on batteries for propulsion, using the battery as a heat source for heating and cooling inevitably leads to a reduction in driving range; to address this issue, the integration of heat pump systems, which have been widely employed in residential heating and cooling systems, into automobiles has been proposed.

Essentially, a heat pump operates by absorbing low-temperature heat and transferring it to a higher temperature. For example, a heat pump cycle involves a liquid fluid evaporating in an evaporator, absorbing heat from its surroundings and becoming a gas, then releasing heat to its surroundings through a condenser and becoming liquid again. Applying this principle to electric or hybrid vehicles offers the advantage of providing a supplementary heat source that is absent in conventional air conditioning systems.

Current electric vehicle heat pump systems employ a partial modularization approach where key components (valves, accumulators, chillers, condensers, internal heat exchangers, sensors, etc.) are connected by piping, requiring separate fittings and connectors for these connections and resulting in necessary spacing between components. These factors lead to drawbacks in terms of packaging, cost, and workability.

To resolve this, technology for modularizing the manifold is being developed, but during the modularization process, there was an issue of performance degradation due to thermal interference between high-temperature and low-temperature fluids.

DISCLOSURE

Technical Problem

An embodiment of the present invention aims to provide a manifold fluid module capable of minimizing thermal interference between refrigerants and improving heat pump performance by separating the high-temperature and low-temperature regions of the fluid.

Technical Solution

According to an embodiment of the present invention, a manifold fluid module integrating at least one heat exchanger, at least one valve, and at least one expansion valve integrated into a single unit for a thermal management system including a compressor, a plurality of heat exchangers, a plurality of valves, and expansion valves, may include a manifold plate including a plurality of fluid passages formed internally, wherein the fluid passages may include a low-temperature fluid passage through which heat-exchanged low-temperature fluid flows and a plurality of fluid inlets and a fluid outlet are connected, with the fluid inlets including an evaporator inlet port connected to an outlet of the evaporator, the evaporator inlet port being arranged on the low-temperature fluid passage.

The at least one heat exchanger may include a first heat exchanger coupled to the manifold plate that exchanges heat between a first fluid and a second fluid, and a second heat exchanger coupled to the manifold plate that exchanges heat between the first fluid discharged from the first heat exchanger and the second fluid.

The evaporator inlet port may be arranged adjacent to a first inlet port through which the first fluid enters the second heat exchanger.

The first fluid, which enters through the first inlet port, may be discharged through a first outlet port, and the evaporator inlet port may be arranged between the first inlet port and the first outlet port.

The fluid outlet may be an accumulator port through which the first fluid is discharged to the accumulator, and the evaporator inlet port may be arranged adjacent to the accumulator port.

The distance between the evaporator inlet port and the accumulator port may be equal to or shorter than the distance between the first outlet port and the accumulator port.

The manifold fluid module may further include a heat transfer barrier formed between a high-temperature fluid passage and a low-temperature fluid passage to prevent heat transfer from the high-temperature fluid passage to the low-temperature fluid passage, and a connecting member connecting the high-temperature fluid passage and the low-temperature fluid passage.

The connecting member may connect the manifold plates separated by the heat transfer barrier, allowing fluid to flow through the connecting member.

The connecting member may allow fluid to flow during heating mode of the thermal management system, while no fluid my flow during cooling mode.

The manifold plate may include a main plate including a fluid passage formed internally, and a bottom plate coupled to one side of the main plate to cover the fluid passage.

The main plate may include a first main plate through which a high-temperature first fluid flows after passing through the first heat exchanger, and a second main plate through which a low-temperature first fluid flows after passing through the second heat exchanger, wherein the heat transfer barrier may be formed between the first main plate and the second main plate.

The bottom plate may include a first bottom plate coupled to cover at least one side of the first main plate, and a second bottom plate coupled to cover at least one side of the second main plate, wherein the heat transfer barrier may be formed between the first bottom plate and the second bottom plate.

The first and second bottom plates may be connected at one side by the connecting member.

The connecting member may be formed in a pipe shape.

The manifold fluid module may further include a first expansion valve configured to expand the first fluid entering the first heat exchanger, and a second expansion valve configured to expand the first fluid entering the second heat exchanger, wherein the first expansion valve may be arranged above the first heat exchanger, the second expansion valve may be arranged above the second heat exchanger, and the first fluid entering the first and second heat exchangers may move from the top to the bottom.

The manifold fluid module may further include a first direction switching valve and a second direction switching valve configured to control the direction of the first fluid discharged from the first heat exchanger, wherein the first direction switching valve may be arranged below the second heat exchanger, and the second direction switching valve may be arranged above the second heat exchanger.

The second main plate may include an accumulator port through which the first fluid is discharged to the accumulator, and the connecting member may be configured to provide communication between the second direction switching valve and the accumulator port.

The connecting member may be arranged between the second direction switching valve and the second heat exchanger.

The manifold plate may include an opening formed in a portion where the second heat exchanger is located, and the heat transfer barrier may include a first heat transfer barrier and a second heat transfer barrier formed above and below the opening, respectively.

The manifold plate may include an opening formed in a portion where the second heat exchanger is located, and the heat transfer barrier may include a first heat transfer barrier and a second heat transfer barrier formed above and below the opening, respectively, wherein the first heat transfer barrier may be configured to cut between the second expansion valve and the first direction switching valve, and the second heat transfer barrier may be configured to cut between the second heat exchanger and the first direction switching valve.

Advantageous Effects

The manifold fluid module according to an embodiment of the present invention is advantageous in terms of improving the performance of the heat pump by employing a structure capable of blocking heat conduction between high-temperature fluid and low-temperature fluid.

MODE FOR INVENTION

Figure 1:
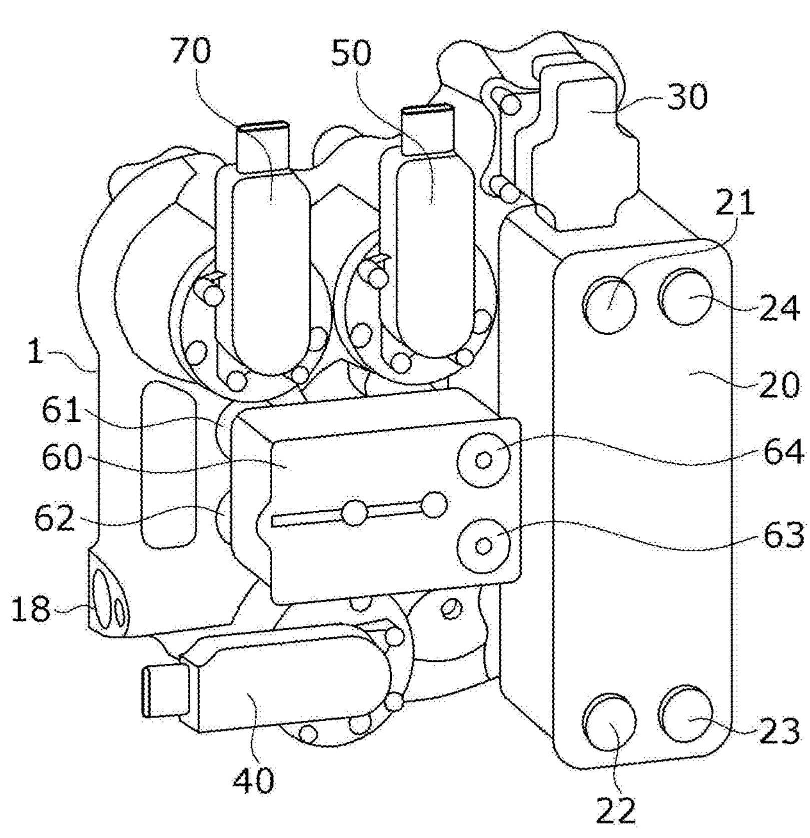
FIG. 1 is a diagram illustrating the front of the manifold fluid module according to an embodiment of the present invention.

While the present invention admits various modifications, the following detailed descriptions and drawings focus on preferred embodiments for clarity. However, such embodiments are not intended to limit the invention and it should be understood that the embodiments encompass all modifications, equivalents, and alternatives within the spirit and scope of the invention. Detailed descriptions of well-known technologies may be omitted to avoid obscuring the subject matter of the present invention.

Terms such as "first," "second," etc. may be used to describe various components, but the components should not be limited by these terms. The terms are used only for distinguishing one component from another component.

The terminology used in this application is employed merely to describe specific embodiments and is not intended to limit the scope of the present invention. The singular forms are intended to include the plural forms as well unless the context clearly indicates otherwise. In this application, terms such as "comprising" or "having" indicate the presence of the features, numbers, steps, operations, components, or parts listed in the specification, without excluding the presence or possibility of one or more other features, numbers, steps, operations, components, or parts or their combinations.

Throughout the specification, the term "connected" not only means that two or more components are directly connected but also includes indirect connections via intermediary components, electrical connections, and instances where components are referred to by different names based on their position or function but are considered as a whole.

Hereinafter, a description is made of the manifold fluid module according to an embodiment of the present invention with reference to accompanying drawing, where identical or corresponding components are assigned the same reference numerals and repetitive descriptions are omitted.

Figure 2:
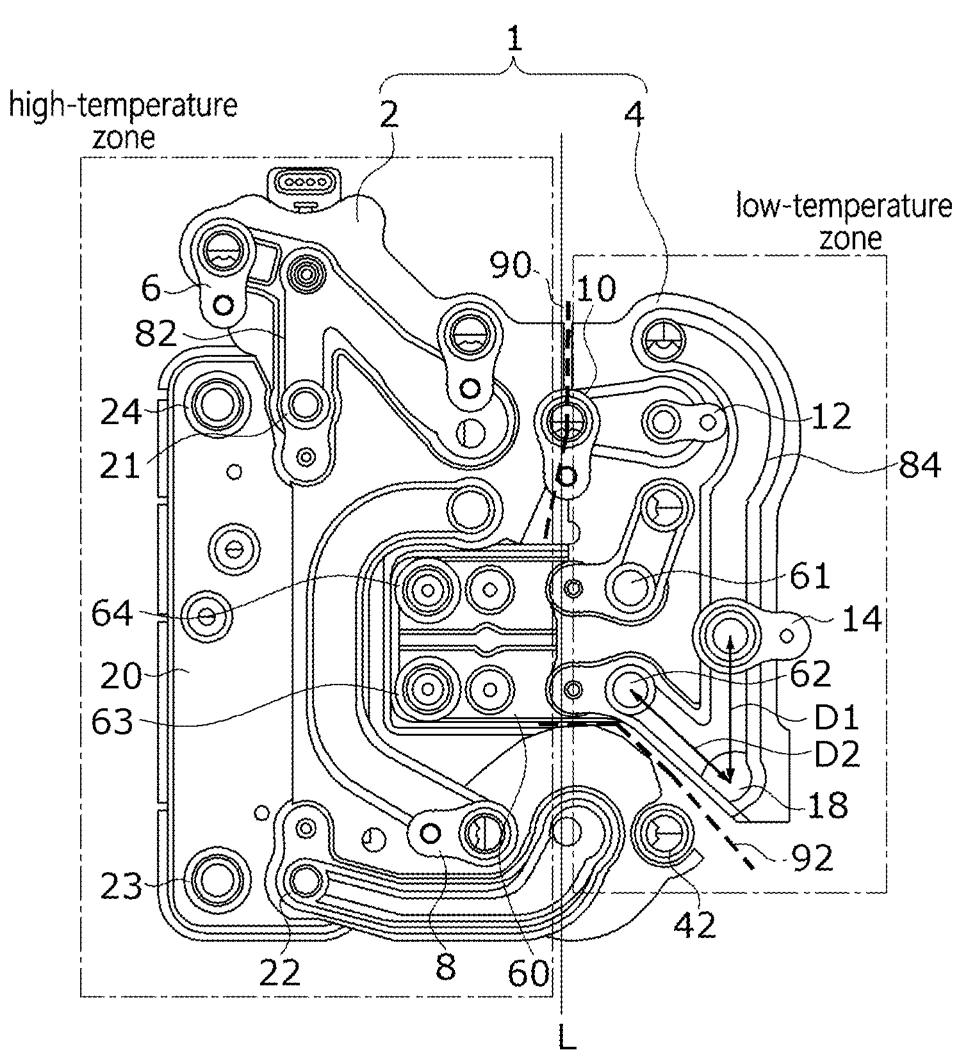
FIG. 2 is a diagram illustrating the rear of a main plate of a manifold fluid module according to an embodiment of the present invention.
Figure 3:
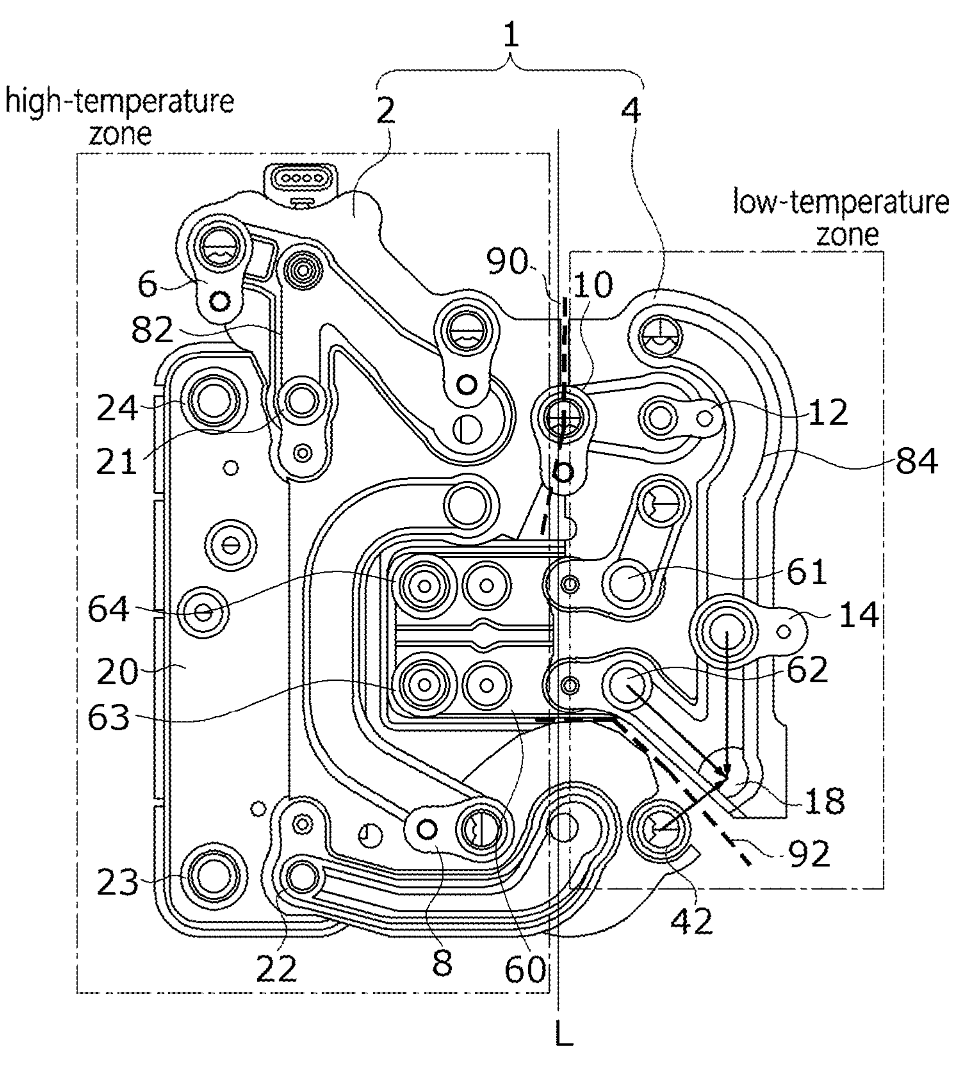
FIG. 3 is diagram illustrating the discharge of refrigerant through an accumulator port in a manifold fluid module according to an embodiment of the present invention.
Figure 4:
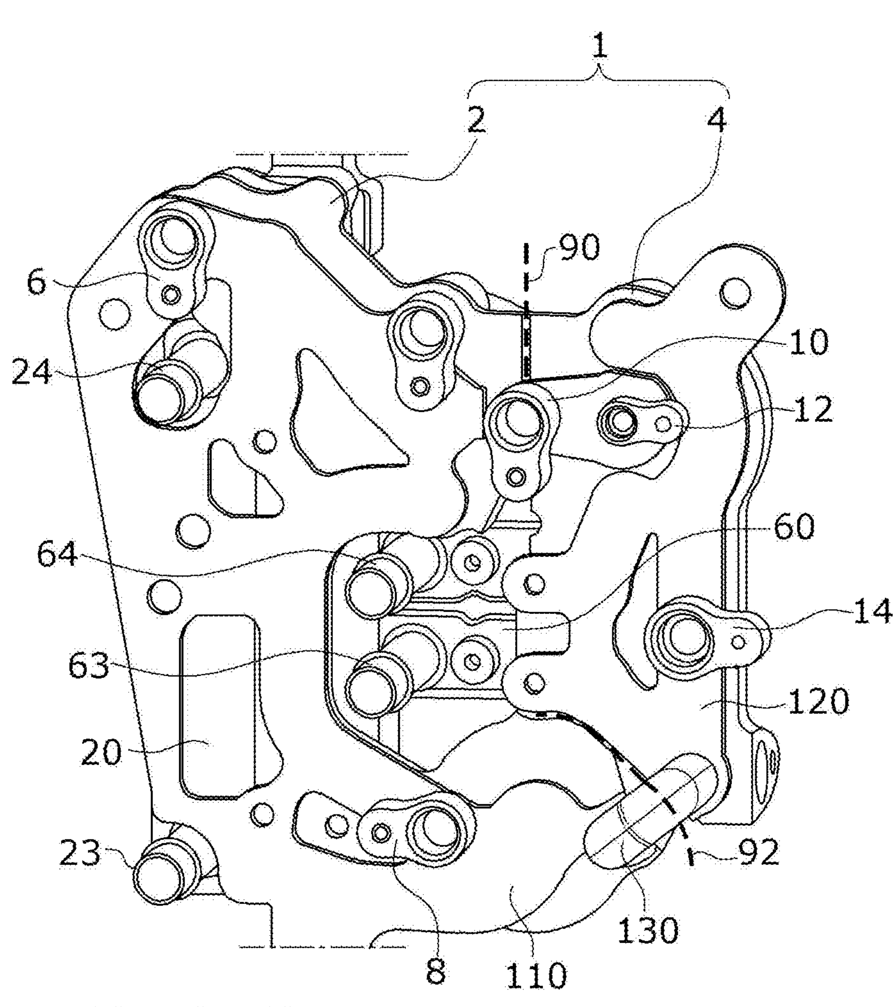
FIG. 4 is a diagram illustrating a bottom plate combined with the main plate depicted in FIG. 2.

FIG. 1 is a diagram illustrating the front of the manifold fluid module according to an embodiment of the present invention, FIG. 2 is a diagram illustrating the rear of a main plate of a manifold fluid module according to an embodiment of the present invention, FIG. 3 is diagram illustrating the discharge of refrigerant through an accumulator port in a manifold fluid module according to an embodiment of the present invention, and FIG. 4 is a diagram illustrating a bottom plate combined with the main plate depicted in FIG. 2.

As shown in the drawings, the manifold fluid module according to an embodiment of the present invention includes manifold plates 1 and 100 with a plurality of fluid passages formed inside through which different temperatures of the fluids flow, heat transfer barriers 90 and 92 formed between the high-temperature fluid passage and the low-temperature fluid passage to block the transfer of heat from the high-temperature fluid passage to the low-temperature fluid passage, and a connecting member 130 connecting the high-temperature and low-temperature fluid passages.

The manifold plates 1 and 100 include an assembly consisting of a main plate 1 and a bottom plate 100, and may be manufactured using methods such as brazing, structural adhesives, and gaskets. The material for the manifold plates 1 and 100 may vary depending on the application and function, such as aluminum, thermoplastic materials, or stainless steel, chosen according to specific needs.

The main plate 1 is generally formed with fluid passages recessed into its interior and has a plate shape with a predetermined thickness. The main plate 1 may be modularized by combining the first heat exchanger 20, the second heat exchanger 60, the expansion valves 30 and 70, and the direction switching valves 40 and 50 of the heat pump system, thereby reducing the number of manufacturing steps and assembly line steps for vehicles. In addition, the main plate 1 may reduce costs and improve workability by performing the functions of piping, fittings, and housing at the same time. That is, in a thermal management system composed of a compressor, a plurality of heat exchangers, a plurality of valves, and expansion valves, the manifold plates 1 and 100 may accommodate at least one heat exchanger 20 or 60, at least one direction switching valve 40 or 50, and at least one expansion valve 30 or 70.

With reference to FIG. 2, a fluid inlet port 6 is provided on the back of the main plate 1 into which high-temperature, high-pressure gaseous fluid discharged from a compressor or internal condenser is introduced. And fluid passages may be formed on the back of the main plate 1 to guide the movement of the fluid for heat exchange, expansion, inflow, and discharge.

In addition, various fluid ports for inflow and discharge of fluid may also be provided on the back of the main plate 1. In this embodiment, an external heat exchanger discharge port 8 through which the first fluid is discharged to an external heat exchanger (air-cooled condenser) and an external heat exchanger inlet port 10 through which the first fluid is introduced from the external heat exchanger are provided. In addition, an evaporator discharge port 12 through which the first fluid is discharged to an evaporator (not shown) and an evaporator inlet port 14 through which the first fluid is introduced from the evaporator are provided. The arrangement of the evaporator inlet port 14 will be described later. Furthermore, there is an accumulator port 18 through which the first fluid discharged from the second heat exchanger 60 is directed to an accumulator (not shown).

With reference back to FIG. 1, the manifold plate 1,100 integrates the first heat exchanger 20 and the second heat exchanger 60 as heat exchange devices. The first heat exchanger 20 and the second heat exchanger 60 allow the first fluid and the second fluid to pass through, exchanging heat therebetween.

In this embodiment, the first heat exchanger 20 may be a water-cooled condenser, and the second heat exchanger 60 may be a chiller. A water-cooled condenser serves to exchange heat between the high-temperature, high-pressure gaseous fluid (refrigerant) discharged from a compressor or internal condenser with an external heat source, thereby condensing the fluid into a high-pressure liquid. A chiller is a device for heat exchange between a low-temperature, low-pressure fluid supplied thereto and a fluid (coolant) circulating in a coolant circulation line (not shown), and the chilled coolant resulting from the heat exchange in the chiller circulates through the coolant circulation line and then used to exchange heat with a battery.

While various fluids such as refrigerants and coolants can be employed as the first and second fluids, this embodiment employs refrigerant as the first fluid and coolant as the second fluid.

The first heat exchanger 20 is equipped with first fluid ports for the inlet and outlet of the first fluid. The first fluid ports include a first inlet port 21 and a first outlet port 22, which are respectively provided at the top and bottom of the first heat exchanger 20. The first inlet port 21 serves as the entry point of the first fluid passed through the first expansion valve 30, while the first outlet port 22 serves as the exit point of the first fluid after heat exchange in the first heat exchanger 20. The first inlet port 21 and the first outlet port 22 may be formed at the top and bottom of the first heat exchanger 20 in the form of a hole.

In this case, considering thermal interference, the first inlet port 21 may be formed on one side close to the first expansion valve 30, and the first outlet port 22 may be formed on the opposite side, farther away from the first expansion valve 30. In more detail, the first inlet port 21 may be positioned closer to the first expansion valve 30 relative to the first outlet port 22. That is, the distance from the first expansion valve 30 to the first inlet port 21 may be shorter than the distance from the first expansion valve 30 to the first outlet port 22.

The first heat exchanger 20 is also equipped with second fluid ports for the inlet and outlet of the second fluid. The second fluid ports include a second inlet port 23 and a second outlet port 24, which are respectively provided at the bottom and top of the first heat exchanger 20. The second inlet port 23 serves as the entry point of the second fluid, while the second outlet port 24 serves as the exit point of the second fluid after heat exchange with the first fluid. The second fluid flows in the opposite direction (bottom to top) compared to the first fluid, while undergoing heat exchange with the first fluid.

The separation between the first fluid ports and the second fluid ports, as described above, is capable of enhancing the assembly efficiency of the first fluid piping and the second fluid piping.

The first expansion valve 30 regulates the expansion of refrigerant entering the first heat exchanger 20. The first expansion valve 30 may be positioned at the top of the first heat exchanger 20 and may control the expansion or passage of the first fluid entering through the fluid inlet port 6. The first fluid entering through the first expansion valve 30 may pass through the first heat exchanger 20, undergoing heat exchange, or proceed to move to an external heat exchanger.

The first fluid discharged through the first outlet port 22 of the first heat exchanger 20 flows into the first direction switching valve 40. The first direction switching valve 40 controls the direction of the first fluid discharged from the first heat exchanger 20. In cooling mode, the first direction switching valve 40 allows the first fluid to be discharged to the external heat exchanger (air-cooled condenser) through the external heat exchanger discharge port 8, while in heat pump mode, the first direction switching valve 40 redirects the first fluid to the accumulator port 18, allowing first fluid to be discharged to the accumulator. The first fluid flows into the low-temperature fluid passage 84 through the first fluid inlet 42 formed in the manifold plates 1 and 100.

The first fluid entering through the first expansion valve 30 may move to the evaporator after passing through the second direction switching valve 50 in dehumidification mode.

The second heat exchanger 60 is supplied with a low-temperature, low-pressure fluid for heat exchange with the coolant circulating in the coolant circulation line (not shown). The chilled coolant, which has undergone heat exchange in the second heat exchanger 60, may circulate through the coolant circulation line for heat exchange with the battery. The first fluid, after undergoing heat exchange with the external heat exchanger, flows into the second expansion valve 70 and, after being expanded in the second expansion valve 70, flows into the second heat exchanger 60. The first fluid, after undergoing heat exchange in the second heat exchanger 60, is discharged through the bottom and flows into the accumulator (not shown).

To facilitate this process, the second heat exchanger 60 is equipped with first fluid ports for the inlet and outlet of the first fluid. The first fluid ports include a first inlet port 61 and a first outlet port 62, which are respectively provided at the top and bottom of the second heat exchanger 60. The first inlet port 61 serves as the entry point of the first fluid, while the first outlet port 62 serves as the exit point of the first fluid after heat exchange in the second heat exchanger 60. The first inlet port 61 and the first outlet port 62 may be formed at the top and bottom of the second heat exchanger 60 in the form of a hole.

In this case, considering thermal interference, the first inlet port 61 of the second heat exchanger 60 may be formed on one side close to the first expansion valve 70, and the first outlet port 62 may be formed on the opposite side, farther away from the first expansion valve 70. In more detail, the first inlet port 61 may be positioned closer to the second expansion valve 70 relative to the first outlet port 62. That is, the distance from the second expansion valve 70 to the first inlet port 61 may be shorter than the distance from the second expansion valve 70 to the first outlet port 62.

The second heat exchanger 60 is also equipped with second fluid ports for the inlet and outlet of the second fluid. The second fluid ports include a second inlet port 63 and a second outlet port 64, which are respectively provided at the bottom and top of the second heat exchanger 60. The second inlet port 63 serves as the entry point of the second fluid, while the second outlet port 64 serves as the exit point of the second fluid after heat exchange with the first fluid. The second fluid flows in the opposite direction (bottom to top) compared to the first fluid, while undergoing heat exchange with the first fluid.

With reference back to FIG. 1, in this embodiment, the first expansion valve 30, the second direction switching valve 50, and the second expansion valve 70 may be arranged on the upper part of the manifold plate 1, 100, the first heat exchanger 20 may be arranged on one side of the lower part of the manifold plate 1, 100, and the second heat exchanger 60 and the first direction switching valve 40 may be arranged on the other side of the lower part of the manifold plate 1, 100. Here, the first direction switching valve 40 may be positioned below the second heat exchanger 60, while the second direction switching valve 50 may be placed above the second heat exchanger 60.

That is, arranging the aforementioned components on the manifold plates 1 and 100 allows for optimal placement of the components in minimal space, thereby maximizing spatial efficiency, and the overall top-to-bottom formation of the fluid flow optimizes the fluid flow as well.

In particular, the first heat exchanger 20 may be arranged vertically on one side of the lower part of the manifold plates 1 and 100, and the second heat exchanger 60 may be arranged horizontally on the other side of the lower part of the manifold plates 1 and 100, thereby optimizing the fluid module package. That is, the second heat exchanger 60 is arranged laterally to the first heat exchanger 20, thereby enhancing space efficiency. Additionally, the first expansion valve 30 is positioned above the first heat exchanger 20, and the second expansion valve 70 is positioned above the second heat exchanger 60, allowing the flow of the first fluid to naturally form from top to bottom.

An imaginary reference line L on the manifold plates 1 and 100 facilitates the arrangement of the first heat exchanger 20, first expansion valve 30, first direction switching valve 40, and second direction switching valve 50 on one side, while the second heat exchanger 60 and second expansion valve 70 may be placed on the other side.

In more detail, the imaginary reference line L divides the manifold plates into a high-temperature zone for the high-temperature first fluid flowing and a low-temperature zone for the low-temperature first fluid during cooling mode. In the high-temperature zone, a high-temperature fluid passage 82 is formed through which the high-temperature first fluid flows, while in the low-temperature zone, a low-temperature fluid passage 84 is formed through which the low-temperature first fluid flows. Components for the high-temperature first fluid movement may be arranged in the high-temperature zone, while components for the low-temperature first fluid movement may be arranged in the low-temperature zone. This configuration is capable of minimizing the thermal interference between the first fluid in high and low temperature conditions and improve the performance of the heat pump system. In the drawings, the high-temperature zone may include the left and bottom sections, while the low-temperature zone may include the right section, excluding the lower right portion.

With reference to FIGS. 2 to 4, the main plate 1 may include a first main plate 1 through which the high-temperature first fluid passing through the first heat exchanger 20 flows, and a second main plate 4 through which a low-temperature first fluid passing through the second heat exchanger 60 flows. Here, the first main plate 1 and the second main plate 4 may be physically separated by a cut.

As the first main plate 1 and the second main plate 4 are separated by a cut structure, the direct heat transfer path between the high-temperature and low-temperature zones is blocked, thereby improving the performance of the heat pump.

The cut structure between the first main plate 1 and the second main plate 4 may be implemented in various ways. As shown in the drawings, heat transfer barriers 90 and 92 are formed between the first main plate 1 and the second main plate 4, and these heat transfer barriers 90 and 92 may be formed in two parts to effectively block heat transfer between the high-temperature and low-temperature zones.

Where the second heat exchanger 60 is arranged on the manifold plates 1 and 100, an opening 80 may be formed to open front and back over a considerable area. The opening 80 is formed to prevent interference with the second inlet port 63 and the second outlet port 64 of the second heat exchanger 60 and to maximize the separation between the high-temperature and low-temperature zones in the manifold plates 1 and 100.

The heat transfer barriers 90 and 92 may be formed above and below the opening 80, respectively, with the first heat transfer barrier 90 formed approximately in the vertical direction above the opening 80, and the second heat transfer barrier 92 formed approximately in the horizontal direction on one side below the opening 80. Of course, the positions of the heat transfer barriers 90 and 92 are not limited to those shown in the drawings and may be placed anywhere capable of separating the high-temperature and low-temperature zones.

That is, since the heat transfer barriers 90 and 92 are formed above and below the opening 80 located in the central part of the manifold plates 1 and 100, the high-temperature zone on the left and the low-temperature zone on the right can be separated.

Meanwhile, the heat transfer barriers 90 and 92 may be formed relative to the positions of components arranged on the manifold plates 1 and 100. The first heat transfer barrier 90 may be formed to cut between the second expansion valve 70 and the first direction switching valve 50, and the second heat transfer barrier 92 may be formed to cut between the second heat exchanger 60 and the first direction switching valve 40. This ensures that the heat transfer barriers 90 and 92 block the heat transfer path by cutting between the components through which the high-temperature first fluid and the low-temperature first fluid flow.

Additionally, to minimize the heat transfer path between the high-temperature and low-temperature zones, the evaporator inlet port 14 may be arranged as follows. The evaporator inlet port 14 is positioned on the low-temperature fluid passage 84, allowing the low-temperature first fluid entering through the evaporator inlet port 14 to move downward and be discharged to the outside through the accumulator port 18. Here, as the length of the flow path for the first fluid increases, there is a greater potential for heat transfer from the high-temperature first fluid. Therefore, in this embodiment, the evaporator inlet port 14 is positioned as close as possible to the accumulator port 18 to minimize the flow path of the low-temperature first fluid.

The low-temperature fluid passage 84 is connected to a plurality of fluid inlets, which may include the first fluid inlet 42, the second outlet port 62 of the second heat exchanger 60, and the evaporator inlet port 14. Among these, the evaporator inlet port 14 is connected to the outlet of the evaporator, allowing the first fluid that has been heat-exchanged in the evaporator to flow in.

The evaporator inlet port 14 may be positioned on the second main plate 4, where the low-temperature first fluid flows. The evaporator inlet port 14 may be placed adjacent to the first inlet port 61 of the second heat exchanger 60, and more specifically, between the first inlet port 61 and the first outlet port 62 of the second heat exchanger 60. That is, by being positioned close to the second heat exchanger 60, where the low-temperature first fluid undergoes heat exchange, the first fluid entering the evaporator inlet port 14 may minimize heat transfer.

The distance (D1) between the evaporator inlet port 14 and the accumulator port 18 may be equal to or shorter than the distance (D2) between the first outlet port 62 of the second heat exchanger 60 and the accumulator port 18. This arrangement aims to minimize heat transfer from the first fluid discharged from the second heat exchanger 60 to the first fluid entering the evaporator inlet port 14.

With reference to FIG. 4, the bottom plate 100 is attached to one side of the main plate 1, specifically the rear side, to cover the fluid passages. The bottom plate 100 may include a first bottom plate 110 that is coupled to cover at least one side of the first main plate 2, and a second bottom plate 120 that is coupled to cover at least one side of the second main plate 4. The first bottom plate 110 and the second bottom plate 120 may be coupled to cover a significant portion of one side of the first main plate 2 and the second main plate 4, as shown in the drawings.

In this case, one side of the first bottom plate 110 and the second bottom plate 120 may be connected by the connecting member 130. Since the main plate 1 is separated by the heat transfer barriers 90 and 92, the bottom plate 100 attached to the main plate 1 may also be separated, which in turn blocks the flow path of the first fluid from the first direction switching valve 40 to the accumulator port 18 during heat pump mode. Therefore, in this embodiment, the connecting member 130 is provided to connect the first bottom plate 110 and the second bottom plate 120 to secure the flow path of the first fluid.

The connecting member 130 allows the first fluid to flow during the heating mode of the thermal management system, when the temperature difference between the high-temperature fluid path and the low-temperature fluid path is small, but prevents the flow of the first fluid during the cooling mode when the temperature difference is large.

The connecting member 130 is formed in a pipe shape, as shown in the drawings, to secure a flow path for the first fluid inside. Alternatively, the connecting member 130 may connect one side of the first bottom plate 110 and the second bottom plate 120 in a plate shape while forming a flow path inside.

The connecting member 130 not only serves as a flow path but also enhances the durability of the manifold plate 1 and 100. In more detail, since the manifold plates 1 and 100 are separated into two parts in this embodiment, the connection structure is maintained only by the components coupled to the manifold plates 1 and 100, which may make the manifold plate 1 and 100 less rigid and susceptible to external impact. Therefore, the connecting member 130 connects the two separated parts of the manifold plates 1 and 100, allowing for a more robust connection structure.

Although the manifold plates 1 and 100 illustrated as being formed by the combination of the main plate 1 and the bottom plate 100, and the connecting member 130 is provided in the bottom plate 100, this is not limiting. For example, the connecting member 130 may be provided in the main plate 1, or the manifold plates 1 and 100 may be made from a single plate with the connecting member 130 included in the manifold plate 1 and 100.

Figure 5:
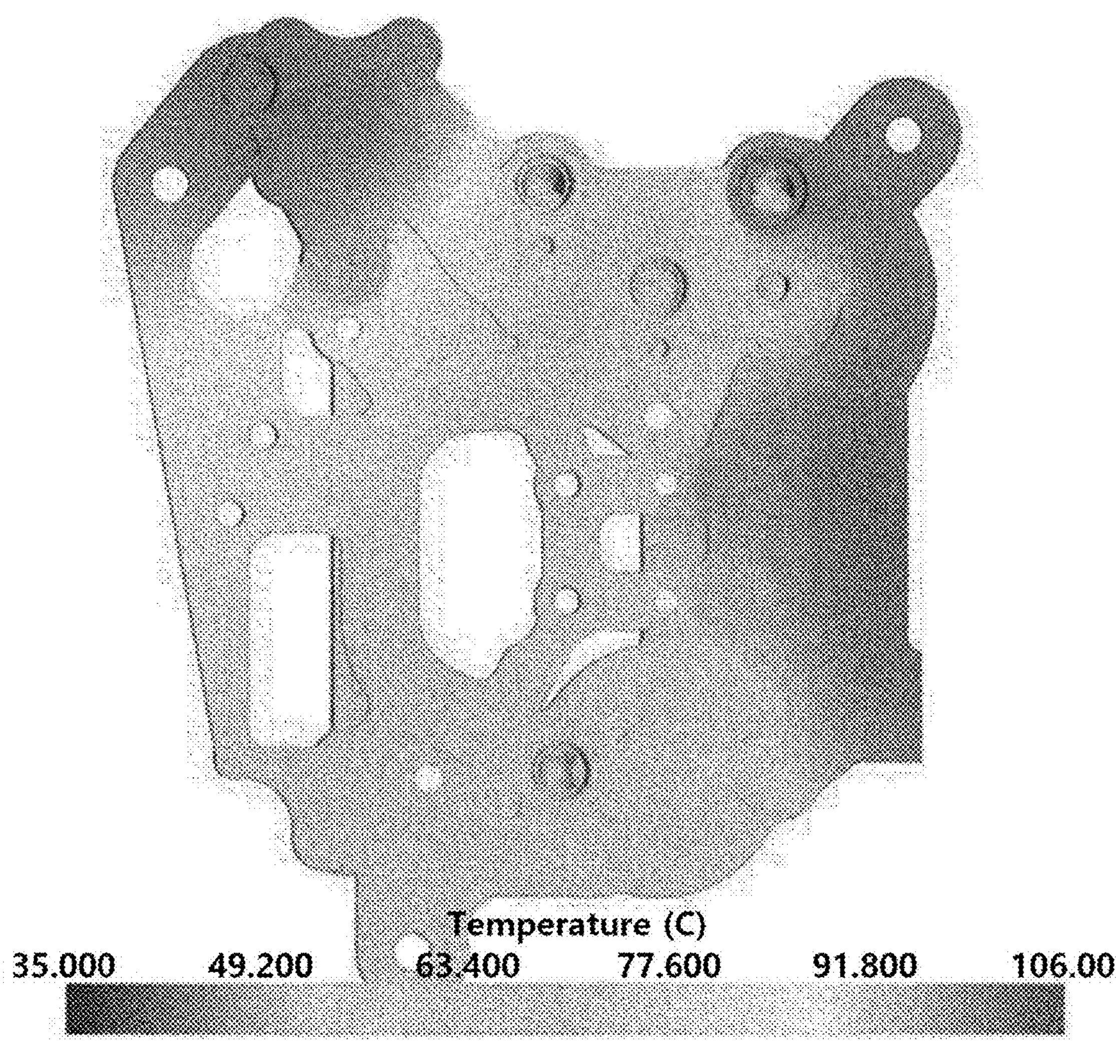
FIG. 5 is a diagram illustrating the amount of heat transfer before applying the cut structure to the manifold fluid module according to an embodiment of the present invention.
Figure 6:
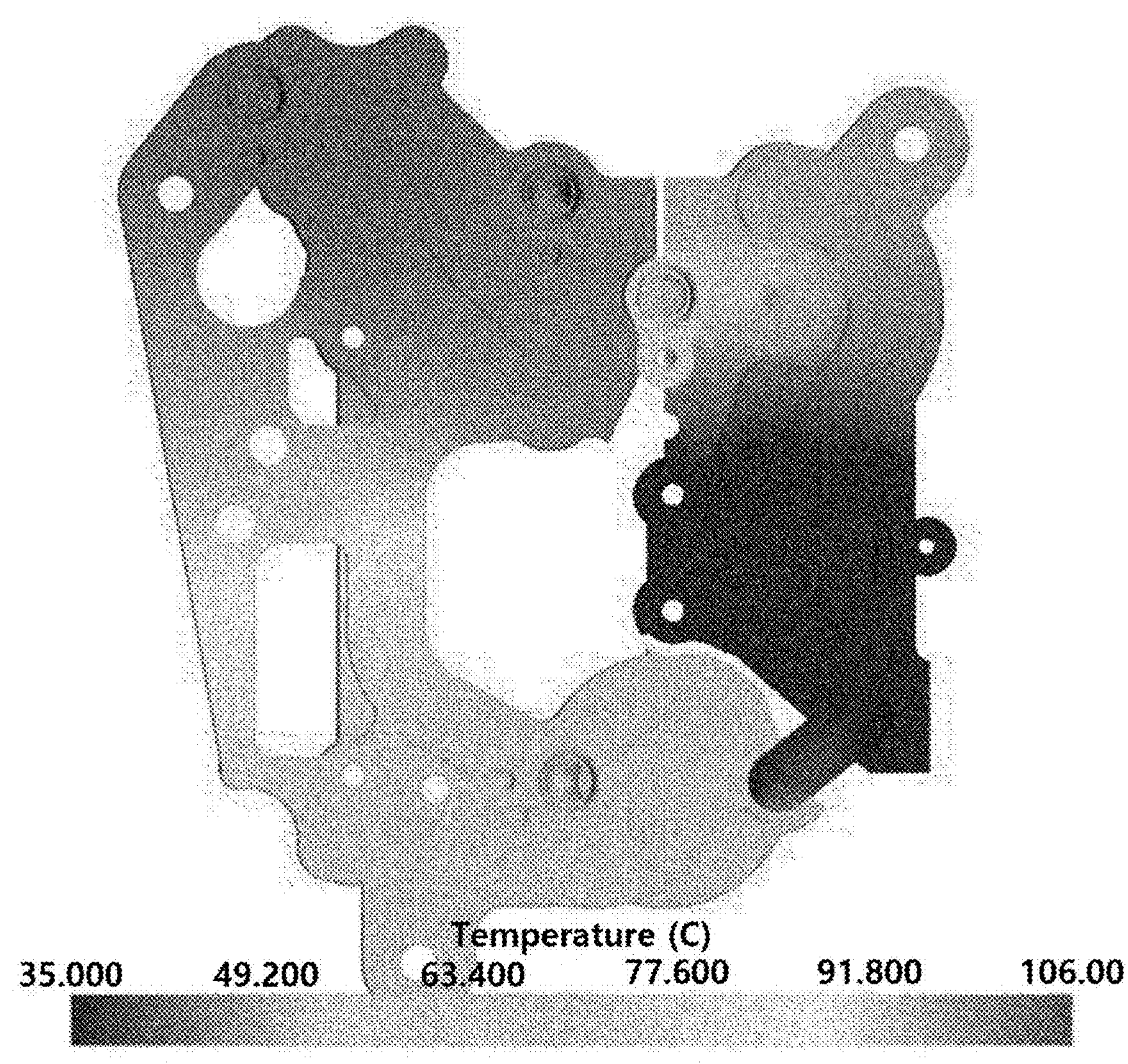
FIG. 6 is a diagram illustrating the amount of heat transfer after applying the cut structure to the manifold fluid module according to an embodiment of the present invention.

FIG. 5 is a diagram illustrating the amount of heat transfer before applying the cut structure to the manifold fluid module according to an embodiment of the present invention, and FIG. 6 is a diagram illustrating the amount of heat transfer after applying the cut structure to the manifold fluid module according to an embodiment of the present invention.

With reference to FIGS. 5 and 6, before applying the cut structure to the manifold fluid module, the temperature of the section where the low-temperature first fluid flows in the manifold plates 1 and 100 appears relatively high.

However, after applying the cut structure to the manifold fluid module, it can be confirmed that the temperature of the section where the low-temperature first fluid flows in the manifold plates 1 and 100 appears relatively low. This is because the cut structure effectively blocks the heat transfer from the high-temperature first fluid to the low-temperature first fluid. Additionally, minimizing the flow path of the low-temperature first fluid entering the evaporator inlet port 14 can further reduce heat transfer.

While the foregoing description has focused on specific embodiments of the present invention, it should be understood that various modifications and changes can be made by those skilled in the art without departing from the spirit and scope of the invention as defined in the appended claims.

[DESCRIPTION OF REFERENCE NUMERALS]

| | |
|---|---|
| 1: main plate | 2: first main plate |
| 4: second main plate | 6: fluid inlet port |
| 8: external heat exchanger discharge port | 10: external heat exchanger inlet port |
| 12: evaporator discharge port | 14: evaporator inlet port |
| 18: accumulator port | 20: first heat exchanger |
| 21: first inlet port | 22: first outlet port |
| 23: second inlet port | 24: second outlet port |
| 30: first expansion valve | 40: first direction switching valve |
| 50: second direction switching valve | 60: second heat exchanger |
| 61: first inlet port | 62: first outlet port |
| 63: second inlet port | 64: second outlet port |
| 70: second expansion valve | 80: opening |
| 82: high-temperature fluid passage | 84: low-temperature fluid passage |
| 90: first heat transfer barrier | 92: second heat transfer barrier |
| 100: bottom plate | 110: first bottom plate |
| 120: second bottom plate | 130: connecting member |

The invention claimed is:

1. A manifold fluid module integrating at least one heat exchanger, at least one valve, and at least one expansion valve integrated into a single unit for a thermal management system, wherein the thermal management system includes including a compressor, a plurality of heat exchangers, a plurality of valves, and expansion valves, wherein the manifold fluid module comprises:

a manifold plate including a plurality of fluid passages formed internally, wherein the fluid passages include a low-temperature fluid passage through which heat-exchanged low-temperature fluid flows and a plurality of fluid inlets and a fluid outlet are connected, with the fluid inlets including an evaporator inlet port connected to an outlet of an evaporator, the evaporator inlet port being arranged on the low-temperature fluid passage;

a thermal isolation slot formed between a high-temperature fluid passage and the low-temperature fluid passage to prevent heat transfer from the high-temperature fluid passage to the low-temperature fluid passage; and a connection bridge connecting the high-temperature fluid passage and the low-temperature fluid passage.

2. The manifold fluid module of claim 1, wherein the at least one heat exchanger comprises:

a first heat exchanger coupled to the manifold plate that exchanges heat between a first fluid and a second fluid; and a second heat exchanger coupled to the manifold plate that exchanges heat between the first fluid discharged from the first heat exchanger and the second fluid.

3. The manifold fluid module of claim 2, wherein the evaporator inlet port is arranged adjacent to a first inlet port through which the first fluid enters the second heat exchanger.

4. The manifold fluid module of claim 3, wherein the first fluid, which enters through the first inlet port, is discharged through a first outlet port, and the evaporator inlet port is arranged between the first inlet port and the first outlet port.

5. The manifold fluid module of claim 4, wherein the fluid outlet is an accumulator port through which the first fluid is discharged to an accumulator, and the evaporator inlet port is arranged adjacent to the accumulator port.

6. The manifold fluid module of claim 5, wherein the distance between the evaporator inlet port and the accumulator port is equal to or shorter than the distance between the first outlet port and the accumulator port.

7. The manifold fluid module of claim 1, wherein the connection bridge connects the manifold plates separated by the thermal isolation slot, allowing fluid to flow through the connection bridge.

8. The manifold fluid module of claim 7, wherein the connection bridge allows fluid to flow during heating mode of the thermal management system, while no fluid flows during cooling mode.

9. The manifold fluid module of claim 1, wherein the manifold plate comprises:

a main plate comprising a fluid passage formed internally; and a bottom plate coupled to one side of the main plate to cover the fluid passage.

10. The manifold fluid module of claim 9, wherein the main plate comprises:

a first main plate through which a high-temperature first fluid flows after passing through the first heat exchanger; and a second main plate through which a low-temperature first fluid flows after passing through the second heat exchanger, wherein the thermal isolation slot is formed between the first main plate and the second main plate.

11. The manifold fluid module of claim 10, wherein the bottom plate comprises:

a first bottom plate coupled to cover at least one side of the first main plate; and a second bottom plate coupled to cover at least one side of the second main plate, wherein the thermal isolation slot is formed between the first bottom plate and the second bottom plate.

12. The manifold fluid module of claim 11, wherein the first and second bottom plates are connected at one side by the connection bridge.

13. The manifold fluid module of claim 12, wherein the connection bridge is formed in a pipe shape.

14. The manifold fluid module of claim 12, further comprising:

a first expansion valve configured to expand the first fluid entering the first heat exchanger; and a second expansion valve configured to expand the first fluid entering the second heat exchanger, wherein the first expansion valve is arranged above the first heat exchanger and the second expansion valve is arranged above the second heat exchanger, allowing the first fluid entering the first and second heat exchangers to flow from the top to the bottom.

15. The manifold fluid module of claim 14, further comprising a first direction switching valve and a second direction switching valve configured to control the direction of the first fluid discharged from the first heat exchanger, wherein the first direction switching valve is arranged below the second heat exchanger, and the second direction switching valve is arranged above the second heat exchanger.

16. The manifold fluid module of claim 15, wherein the second main plate comprises an accumulator port through which the first fluid is discharged to an accumulator, and the connection bridge is configured to provide communication between the second direction switching valve and the accumulator port.

17. The manifold fluid module of claim 15, wherein the connection bridge is arranged between the second direction switching valve and the second heat exchanger.

18. The manifold fluid module of claim 17, wherein the manifold plate comprises an opening formed in a portion where the second heat exchanger is located, and the thermal isolation slot comprises a first thermal isolation slot and a second thermal isolation slot formed above and below the opening, respectively.

19. The manifold fluid module of claim 15, wherein the manifold plate comprises an opening formed in a portion where the second heat exchanger is located, and the thermal isolation slot comprises a first thermal isolation slot and a second thermal isolation slot formed above and below the opening, respectively, wherein the first thermal isolation slot is configured to cut between the second expansion valve and the first direction switching valve, and the second thermal isolation slot is configured to cut between the second heat exchanger and the first direction switching valve.

* * * * *